United States Patent [19]
Wright

[11] Patent Number: 5,668,542
[45] Date of Patent: Sep. 16, 1997

[54] COLOR COCKPIT DISPLAY FOR AIRCRAFT SYSTEMS

[75] Inventor: David W. Wright, Franklin, Wis.

[73] Assignee: The United States of America as represented by the Secretary of the Air Force, Washington, D.C.

[21] Appl. No.: 497,916

[22] Filed: Jul. 3, 1995

[51] Int. Cl.$^6$ ................................ G01C 21/00
[52] U.S. Cl. .................. 340/971; 340/945; 340/973; 73/178 R; 701/123; 701/14
[58] Field of Search .................. 340/945, 971, 340/973, 974, 975, 964, 961, 946; 364/424.06, 442; 73/178 R

[56] References Cited

U.S. PATENT DOCUMENTS

| | | | |
|---|---|---|---|
| 4,212,064 | 7/1980 | Fossythe et al. | 340/971 |
| 4,312,041 | 1/1982 | DeJonge | 364/442 |
| 4,583,094 | 4/1986 | Mosier | 340/973 |
| 4,626,851 | 12/1986 | Tooze | 340/973 |
| 4,688,029 | 8/1987 | Kawasaki et al. | 340/618 |
| 4,860,007 | 8/1989 | Konicke et al. | 340/973 |
| 4,891,971 | 1/1990 | Jones et al. | 73/117.3 |
| 4,914,733 | 4/1990 | Gralnick | 340/961 |
| 5,001,468 | 3/1991 | Brice et al. | 345/50 |
| 5,050,081 | 9/1991 | Abbott et al. | 364/424.06 |
| 5,134,394 | 7/1992 | Beadle | 340/975 |
| 5,250,947 | 10/1993 | Worden et al. | 340/973 |
| 5,359,890 | 11/1994 | Fulton et al. | 340/973 |
| 5,404,766 | 4/1995 | Thomas | 73/866.3 |
| 5,412,382 | 5/1995 | Leard et al. | 340/474 |
| 5,416,705 | 5/1995 | Barnett | 340/974 |

*Primary Examiner*—Jeffery Hofsass
*Assistant Examiner*—Benjamin C. Lee
*Attorney, Agent, or Firm*—Fredric L. Sinder; Thomas L. Kundert

[57] ABSTRACT

A new aircraft cockpit instrument panel display system for showing the operating status of different aircraft systems is disclosed. The color display includes a plurality of display segments. Each display segment combines trend qualitative information of the direction of movement of aircraft system parameters, categorical qualitative information of whether aircraft system parameters are inside or outside acceptable ranges, and quantitative information of the actual level of aircraft system parameters. Trend information is indicated by an analog dial display element having a moving needle to indicate rising, falling or constant values of the parameter. The dial display also includes peg positions to indicate that the value of a system parameter has "pegged" at its lowest or highest value. Categorical qualitative information is indicated by the color of the dial, generally green for safe values, yellow for cautionary values and red for danger values. Quantitative information is indicated by a digital indicator. The display also includes labels for each parameter and a indicator of the then current flight status of the aircraft. The ranges for safe, cautionary and danger values, and for trend values, dynamically change according to flight status and pilot-programmable parameters.

14 Claims, 3 Drawing Sheets

COLOR COCKPIT DISPLAY FOR AIRCRAFT SYSTEMS

RIGHTS OF THE GOVERMENT

The invention described herein may be manufactured and used by or for the Government of the United States for all governmental purposes without the payment of any royalty.

BACKGROUND OF THE INVENTION

The present invention relates generally to instrument panel displays, and more specifically to an aircraft instrument panel display for showing the operating status of different aircraft systems.

Most aircraft cockpit instrument panels still use electromechanical gauges to convey to a pilot aircraft system parameters such as engine rpm, engine oil pressure, fuel quantity and cockpit air pressure. Compared to newer information display technologies, such as electronic color video displays, these prior art systems are time-intensive to read and interpret.

Color video displays are increasingly being used in aircraft cockpits for their reliability, maintainability and particularly for their ability to relate useful information to aircraft crew members in a more intuitive manner. Despite advances, the full potential of these color displays for aircraft instrument panels has not been realized.

Thus it is seen that there is a need for a color video display for aircraft instrument panels that will reduce cockpit workload by conveying to aircrew members the status of aircraft systems with a quick glance.

It is, therefore, a principal object of the present invention to provide a color video display system for aircraft instrument panels that with a quick glance intuitively conveys to aircrew members both routine and critical information on the status of aircraft systems.

It is a feature of the present invention that it provides aircrew members with an easily recognizable analog target for guiding their operation of aircraft controls.

It is an advantage of the present invention that its display approach allows easy modification for different systems without losing any of its intuitiveness.

These and other objects, features and advantages of the present invention will become apparent as the description of certain representative embodiments proceeds.

SUMMARY OF THE INVENTION

The present invention provides a new apparatus and method for showing the operating status of aircraft systems. The breakthrough discovery of the present invention is a new combination of display segments that conveys in a single glance (1) trend qualitative information of the direction of movement of aircraft system parameters, (2) categorical qualitative information of whether aircraft system parameters are inside or outside acceptable ranges, and (3) quantitative information of the actual level of aircraft system parameters.

Accordingly, the present invention is directed to an aircraft instrument panel display system and related method for showing the operating status of selected aircraft systems, comprising a plurality of display segments, each display segment corresponding to a selected aircraft system parameter, wherein each display segment includes a numeric representation of the then quantitative value of the selected aircraft system parameter; an analog dial representation of the trend qualitative value of the selected aircraft system parameter; and, a color corresponding to a category defined by a preselected range of operating status values for the selected system parameter. Each display segment may further include an alphanumeric label for the selected aircraft system parameter. The display system may further comprise an alphanumeric representation of the then current flight status of the aircraft. The analog dial representation may further include a needle, wherein clockwise movement of the needle indicates an increasing value for that parameter, counterclockwise movement of the needle indicates a decreasing value for that parameter, a first preselected position for the needle indicates a lower limit for that parameter, and a second preselected position for the needle indicates an upper limit for that parameter. The first preselected position for each analog dial representation may be 3 o'clock and the second preselected position for each analog dial representation may be 12 o'clock. The colors corresponding to a preselected operating status of the selected aircraft system parameter may be green for a preselected normal range of values for the selected aircraft system parameter, yellow for a preselected cautionary range of values for the selected aircraft system parameter, and red for a preselected out-of-limits range of values for the selected aircraft system parameter.

The present invention is also directed to any instrument panel display system and related method for showing the operating status of selected systems, comprising a computer controlled video display, shown on the display, a plurality of display segments, each display segment corresponding to a selected system parameter, wherein each display segment includes a numeric representation of the then quantitative value of the selected system parameter, an analog dial representation of the trend qualitative value of the selected system parameter, and a color corresponding to a category defined by a preselected range of operating status values for the selected system parameter. Each display segment may further include an alphanumeric label for the selected system parameter. The analog dial representation may further include a needle, wherein clockwise movement of the needle indicates an increasing value for that parameter, counterclockwise movement of the needle indicates a decreasing value for that parameter, a first preselected position for the needle indicates a lower limit for that parameter, and a second preselected position for the needle indicates an upper limit for that parameter.

BRIEF DESCRIPTION OF THE DRAWINGS

The present invention will be more clearly understood from a reading of the following detailed description in conjunction with the accompanying drawings wherein.

DETAILED DESCRIPTION

Figure 1:
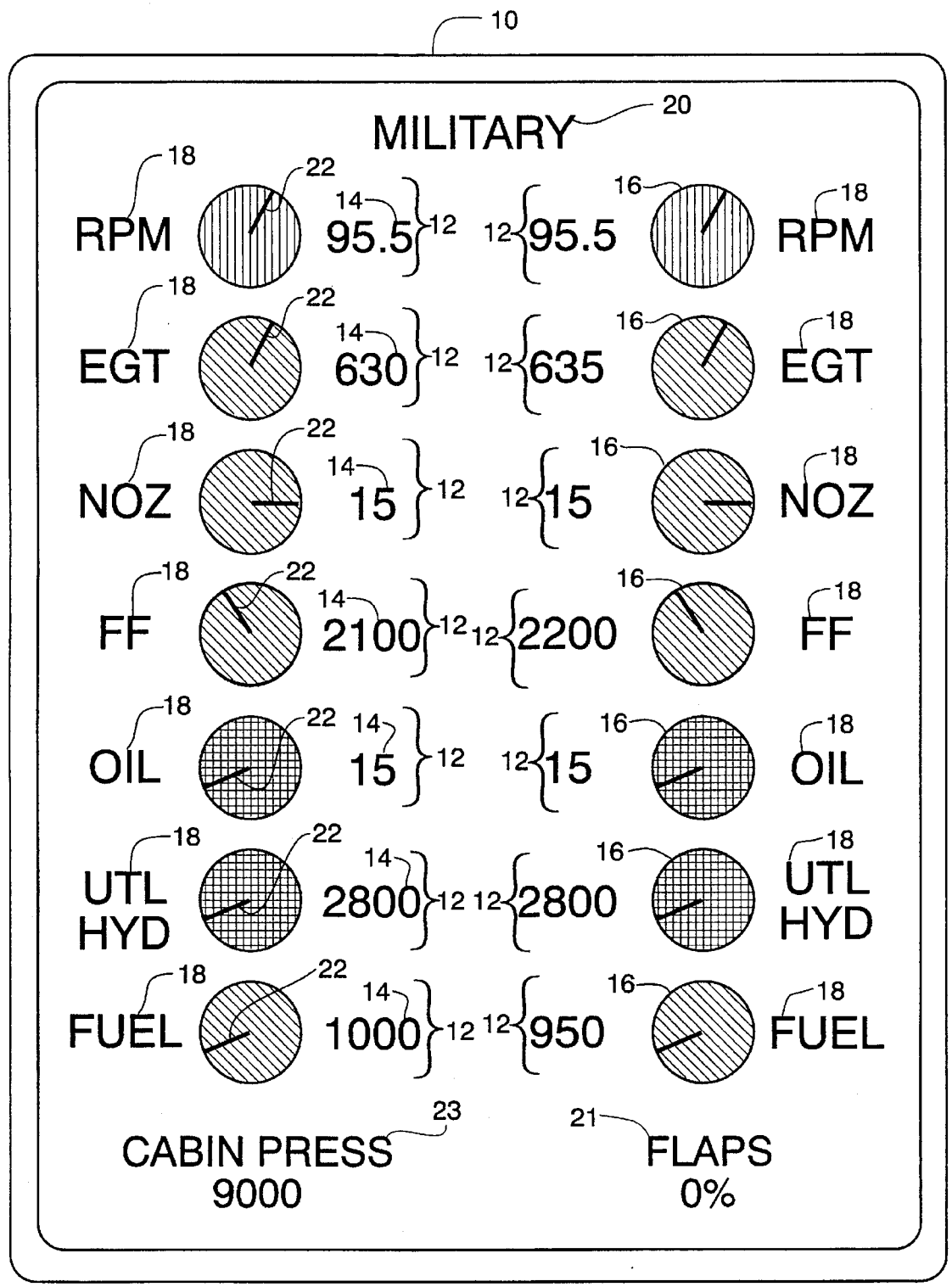
FIG. 1 is an example aircraft instrument panel video display of the operating status of a two engine jet aircraft generated by an aircraft instrument panel display system made according to the teachings of the present invention.

Referring now to FIG. 1 of the drawings, there is shown an example aircraft instrument panel video display 10 of the operating status of a two engine jet aircraft generated by an aircraft instrument panel display system made according to the teachings of the present invention. The readings shown on video display 10 are to demonstrate the teachings of the invention and are not necessarily actual or even possible readings from a real aircraft. Video display 10 comprises a plurality of individual display segments 12. Each display segment 12 includes: a quantitative numeric representation 14 of the then actual value of a particular aircraft system parameter, such as engine rpm; a qualitative analog dial representation 16 of the trend of the aircraft system parameter, that is, whether the value of that aircraft system parameter is then rising, falling, constant, or "pegged" at either its then upper or then lower limit; and, a color for the dial representation 16 corresponding to a qualitative category such as green for that aircraft system parameter then being within a safe range of operation values, yellow for then being within a cautionary range of operation values and red for then being within a danger, or out-of-limits, range of operation values. In FIG. 1, green is indicated by left-leaning hatch lines, red by vertical hatch lines and yellow by crossed hatch lines. FIG. 1 is shown as black symbols on a white background. On an actual aircraft instrument panel video display, the symbols would more likely be shown as white, or colored, symbols on a black background.

Each display segment 12 also includes an alphanumeric label 18 identifying each specific aircraft system parameter. System parameters for this example display for a two engine jet aircraft include, for left and right engines, engine rpm (RPM), exhaust gas temperature (EGT), percent nozzle expansion (NOZ), fuel flow (FF), oil pressure (OIL), utility hydraulics (UTL HYD), and for left and right fuel tanks, fuel quantity (FUEL).

Display 10 also includes an alphanumeric representation 20 of the then current flight operating condition of the aircraft. Aircraft, particularly military aircraft, will be in a different flight condition during different stages or phases of flight. Examples for a fighter aircraft include an Engine Start condition, Take Off, Climb, Cruise, Military and Maximum. Military flight condition indicates full power and Maximum indicates the use of afterburners. Other types of aircraft, such as cargo or other heavy aircraft, have both similar flight conditions and other flight conditions unique to the operation of those aircraft. As will be obvious to those of ordinary skill in the art, each flight condition involves different allowable upper and lower limits, as well as different normal values, for various engine parameters. For example, both the maximum and minimum allowable oil pressure before a cautionary or danger status exists is lower at Engine Start than at Cruise. Similarly, maximum engine rpm before a cautionary or danger status exists is higher during Climb conditions than during Cruise conditions. Those with skill in the art will readily see ways of automatically determining the then current operating condition of an aircraft. An example for fighter aircraft would be throttle position.

The trend qualitative readings shown by dial representation 16 are not intended to indicate absolute or actual values. Instead, they show trends so that an aircrew member can quickly with a glance determine whether a parameter then in a safe range of values will need closer attention. In this embodiment, rising values are shown by clockwise movement of a dial needle 22, falling values are indicated by counter-clockwise movement, and constant values are indicated by showing the needle at its last or a preselected fixed position. To aid in conveying information quickly, the 12 o'clock and 1 o'clock needle positions are chosen as the upper and lower limits for the range of possible (or alternatively, allowable) values so that an aircrew member can quickly see whether or not a system parameter is "pegged." Other limits, such as 12 o'clock and 3 o'clock, may be chosen to increase the separation between the highest and the lowest level to reduce the possibility of confusion.

Both the trend qualitative readings shown by dial representation 16 (including the values for the upper and lower "peg" positions) and the categorical qualitative readings shown by the color of dial representation 16 will dynamically change according to what flight condition the aircraft is then in. For example, in FIG. 1, during a Military flight condition, exhaust gas temperature, percent nozzle expansion (important during afterburner use), fuel flow and fuel quantity are within normal or safe limits. Oil pressure, utility hydraulics and fuel quantity are in a caution range. Engine speed is in the danger zone, indicating insufficient engine speed to maintain Military flight condition. In a different flight condition, such as Cruise, many of the readings might be in a different category. For example, oil pressure and utility hydraulics may change to green because lower pressures are safe during that less demanding flight condition.

Qualitative categories such as fuel status can be pilot programmed or preset. For example, in a twin engine jet aircraft, the pilot can program the display system to show two yellow fuel dials for joker fuel, a warning level indicating that the pilot is about to reach bingo fuel, a fuel quantity just enough to return to home base or to an alternative base in case of bad weather. The display system can also be programmed to show one red dial when there is a fuel imbalance greater than an operating manual acceptable limit. A heavy aircraft's fuel display could be programmed to indicate a fuel burn sequence that would control the aircraft's center of gravity and optimize fuel efficiency. A flap indicator 21 would turn red when the indication disagrees with the actual flap handle position. The cabin pressure gauge 23 would turn red when the cabin pressure was out of limits.

The described display system can also provide target values to simplify aircraft operation. For example, on heavy aircraft, take-off rated thrust (TRT) could be set by the pilot not flying the aircraft (or by flight engineers on those aircraft having a flight engineer position) by pushing the throttles forward until the needles (or hands) in the Engine Pressure Ratio (EPR) dials reach the 12 o'clock position, a much more easily recognizable target than trying to read prior art digital readouts.

The rate at which the dial needles rotate also conveys information, particularly to aircrew members familiar with the aircraft and who can quickly look to make certain an expected rate of movement is occurring. This trend qualitative information is particularly valuable with multi-engine aircraft. For example, in a four engine heavy aircraft, a pilot will be able to quickly view all four rpm dial needles to see whether they are all moving together at about the same rate. If one needle, representing one engine, is not moving at the same rate as the others, the pilot knows that something is likely wrong, even if all other indicators are normal.

Figure 2:
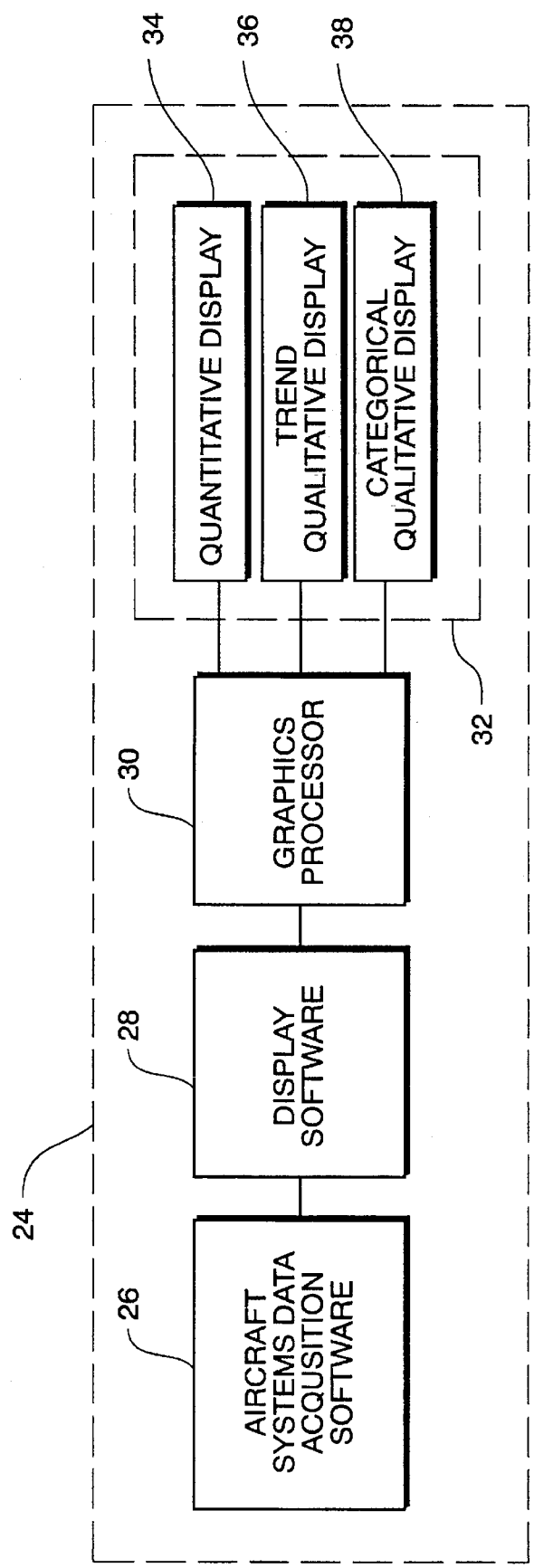
FIG. 2 is an example hardware block diagram for an aircraft instrument panel display system according to the teachings of the present invention; and, FIG. 3 is an example software block diagram for generating an aircraft instrument panel display according to the teachings of the present invention.

FIG. 2 shows an example hardware block diagram for an aircraft instrument panel display system 24 for generating a display such as shown in FIG. 1. Display system 24, which may comprise a single computer or components distributed among several computers, includes a processor 26 for running aircraft systems data acquisition software, a processor 28 for running display software, a graphics processor 30, and resulting display segments 32 (of which only one is shown in this figure) including a quantitative display or representation 34, a trend qualitative display or representation 36 and a categorical qualitative display or representation 38.

Figure 3:
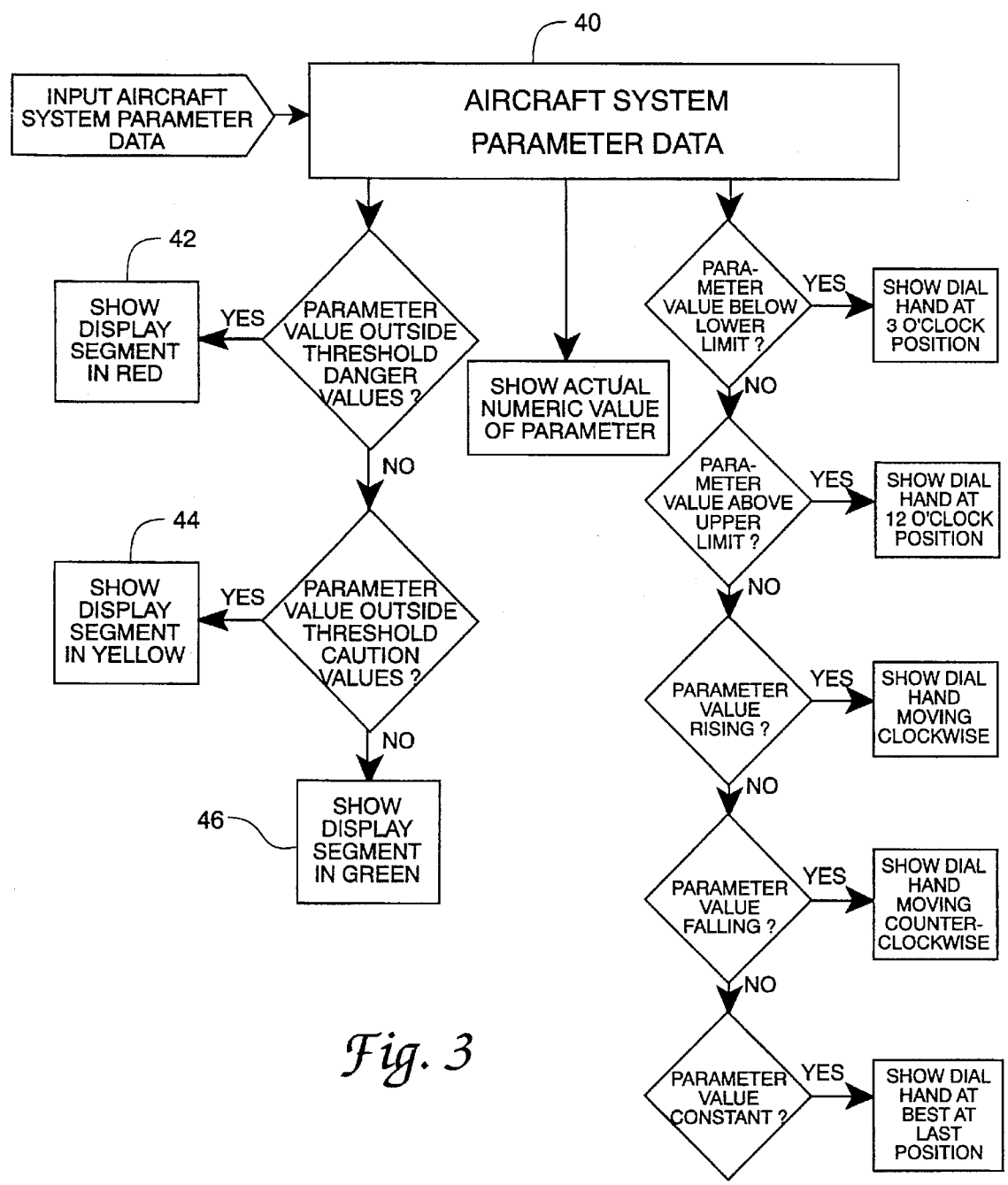

FIG. 3 shows a simplified example software block diagram for generating an aircraft instrument panel display. Aircraft system parameter data 40 includes not only the then current values for various system parameters, but also the current flight condition so that the various referenced threshold values and upper and lower limits are dynamically changing. In an alternative embodiment, software blocks 42, 44 and 46 show the entire display segment being displayed in the categorical representation color. In most cases, only the dial will be shown in a category representation color and the other elements of each display segment shown in a normal aircraft video display color.

The disclosed display system allows a pilot or other aircrew member to quickly check that aircraft systems are within limits for the given flight operating condition by using color to give status. The display is aircraft and display-size dependent. A C-141 with four engines will require more display size than a T-38, while the T-38 requires nozzle indicators because of its afterburners. Displays, therefore, must be tailored to each specific aircraft.

The disclosed instrument panel display system successfully demonstrates that combining in a single display segment separate display elements for separately showing parameter trend information, category information and actual value information intuitively conveys to system operators, such as aircraft pilots, system status with a quick glance. Although the disclosed display system is specialized, its teachings will find application in other areas where information needs to be conveyed quickly.

Those with skill in the art will readily see that the disclosed aircraft instrument panel display can be easily generalized to any instrument panel display. Those with skill in the art will also readily see other approaches for conveying any of the display elements. For example, rather than providing upper and lower peg values for the qualitative trend dial display element, the dial needle could be allowed to spin at a rate proportionate to the rate of fall or rise of actual parameter. Therefore, all embodiments contemplated have not been shown in complete detail. Other embodiments may be developed without departing from the spirit of the invention or from the scope of the claims.

I claim:

1. An instrument panel display system for showing the operating status of selected systems for an apparatus having more than one possible operating condition, comprising:
   (a) a computer controlled video display;
   (b) shown on the display, a plurality of display segments, each display segment corresponding to a selected system parameter for the apparatus, wherein each display segment includes:
      (i) a numeric representation of a current quantitative value of the selected system parameter;
      (ii) an analog dial representation of the trend qualitative value of the selected system parameter, the analog dial including a needle, wherein:
         (1) clockwise movement of the needle indicates an increasing value for that parameter;
         (2) counterclockwise movement of the needle indicates a decreasing value for that parameter;
         (3) a first preselected position for the needle indicates a lower limit for that parameter; and,
         (4) a second preselected position for the needle indicates an upper limit for that parameter;
         (5) wherein the range of values for the selected system parameter for the apparatus between the first preselected needle position and the second preselected needle position is dynamically selected according to the then current operating condition of the apparatus; and,
      (iii) a color corresponding to a dynamically selected category defined by a preselected range of operating status values for the selected system parameter, wherein the dynamically selected category is dynamically selected according to the then current operating condition of the apparatus; and,
   (c) wherein the then current operating condition of the aircraft is automatically determined.

2. The instrument panel display system according to claim 1, each display segment further including an alphanumeric label for the selected system parameter.

3. An aircraft instrument panel display system for showing the operating status of selected aircraft systems for an aircraft having more than one possible flight condition, comprising a plurality of display segments, each display segment corresponding to a selected aircraft system parameter, wherein each display segment includes:
   (a) a numeric representation of a current quantitative value of the selected aircraft system parameter;
   (b) an analog dial representation of the trend qualitative value of the selected aircraft system parameter, the analog dial including a needle, wherein:
      (i) clockwise movement of the needle indicates an increasing value for that parameter;
      (ii) counterclockwise movement of the needle indicates a decreasing value for that parameter;
      (iii) a first preselected position for the needle indicates a lower limit for that parameter; and,
      (iv) a second preselected position for the needle indicates an upper limit for that parameter;
      (v) wherein the range of values for the selected aircraft system parameter between the first preselected needle position and the second preselected needle position is dynamically selected according to the then current flight condition of the aircraft; and,
   (c) a color corresponding to a dynamically selected category defined by a preselected range of operating status values for the selected system parameter, wherein the dynamically selected category is dynamically selected according to the then current flight condition of the aircraft, and wherein the then current flight condition of the aircraft is automatically determined.

4. The aircraft instrument panel display system according to claim 3, each display segment further including an alphanumeric label for the selected aircraft system parameter.

5. The aircraft instrument panel display system according to claim 3, further comprising an alphanumeric representation of the then current flight condition of the aircraft.

6. The aircraft instrument panel display system according to claim 3, wherein:
   (a) the first preselected position for each analog dial representation is 3 o'clock; and,
   (b) the second preselected position for each analog dial representation is 12 o'clock.

7. The aircraft instrument panel display system according to claim 3, wherein the colors corresponding to the categories defined by the ranges of preselected operating status values of the selected aircraft system parameter are:
   (a) green for a preselected normal range of values for the selected aircraft system parameter;

(b) yellow for a preselected cautionary range of values for the selected aircraft system parameter; and, (c) red for a preselected out-of-limits range of values for the selected aircraft system parameter.

8. The aircraft instrument panel display system according to claim 3, wherein the automatic determination of the then current flight condition of the aircraft is determined according to throttle position.

9. A method for showing the operating status of selected aircraft systems on an aircraft instrument panel display for an aircraft having more than one possible flight condition, comprising the step of displaying on an aircraft instrument panel display a plurality of display segments, each display segment corresponding to a selected aircraft system parameter, wherein each display segment includes:

(a) a numeric representation of a current quantitative value of the selected aircraft system parameter;

(b) an analog dial display of the trend qualitative value of the selected aircraft system parameter, the analog dial display including a needle, wherein:
  (i) clockwise movement of the needle indicates an increasing value for that parameter;
  (ii) counterclockwise movement of the needle indicates a decreasing value for that parameter;
  (iii) a first preselected position for the needle indicates a lower limit for that parameter; and,
  (iv) a second preselected position for the needle indicates an upper limit for that parameter;
  (v) wherein the range of values for the selected aircraft system parameter between the first preselected needle position and the second preselected needle position is dynamically selected according to the then current flight condition of the aircraft;

(c) a color corresponding to a dynamically selected category defined by a preselected range of operating status values for the selected system parameter, wherein the dynamically selected category is dynamically selected according to the then current flight condition of the aircraft; and, (d) wherein the then current flight condition of the aircraft is automatically determined.

10. The method for showing the operating status of selected aircraft systems on an aircraft instrument panel display according to claim 9, wherein each display segment further includes an alphanumeric label for the selected aircraft system parameter.

11. The method for showing the operating status of selected aircraft systems on an aircraft instrument panel display according to claim 9, further comprising the step of displaying an alphanumeric representation of the then current flight condition of the aircraft.

12. The method for showing the operating status of selected aircraft systems on an aircraft instrument panel display according to claim 9, wherein the automatic determination of the then current flight condition of the aircraft is determined according to throttle position.

13. A method for showing on an instrument panel display the operating status of selected systems for an apparatus having more than one possible operating condition, comprising the step of displaying on an instrument panel display a plurality of display segments, each display segment corresponding to a selected system parameter, wherein each display segment includes:

(a) a numeric representation of a current quantitative value of the selected system parameter;

(b) an analog dial representation of the trend qualitative value of the selected system parameter, the analog dial including a needle, wherein:
  (i) clockwise movement of the needle indicates an increasing value for that parameter;
  (ii) counterclockwise movement of the needle indicates a decreasing value for that parameter;
  (iii) a first preselected position for the needle indicates a lower limit for that parameter; and,
  (iv) a second preselected position for the needle indicates an upper limit for that parameter;
  (v) wherein the range of values for the selected system parameter between the first preselected needle position and the second preselected needle position is dynamically selected according to the then current operating condition of the apparatus;

(c) a color corresponding to a dynamically selected category defined by a preselected range of operating status values for the selected system parameter, wherein the dynamically selected category is dynamically selected according to the then current operating condition of the apparatus;

(d) wherein the then current operating condition of the apparatus is automatically determined.

14. The method for showing on an instrument panel display the operating status of selected systems according to claim 13, wherein each display segment further includes an alphanumeric label for the selected system parameter.

* * * * *